(12) United States Patent
Oh (10) Patent No.: US 12,221,132 B2
(45) Date of Patent: Feb. 11, 2025

(54) APPARATUS FOR CONTROLLING DRIVING MODE OF ROBO-TAXI AND METHOD THEREOF

(71) Applicants: Hyundai Motor Company, Seoul (KR); Kia Corporation, Seoul (KR)

(72) Inventor: Da Ye Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 230 days.

(21) Appl. No.: 17/891,509

(22) Filed: Aug. 19, 2022

(65) Prior Publication Data
US 2023/0264717 A1     Aug. 24, 2023

(30) Foreign Application Priority Data
Feb. 18, 2022  (KR) .................. 10-2022-0021686

(51) Int. Cl.
G05D 1/227     (2024.01)
B60W 60/00     (2020.01)

(52) U.S. Cl.
CPC .. B60W 60/00253 (2020.02); B60W 60/0051 (2020.02); B60W 60/0053 (2020.02); G05D 1/227 (2024.01)

(58) Field of Classification Search
CPC ....... B60W 60/00253; B60W 60/0051; B60W 60/0053
See application file for complete search history.

(56) References Cited

U.S. PATENT DOCUMENTS

| | | | |
|---|---|---|---|
| 9,665,101 B1* | 5/2017 | Templeton | B60W 40/08 |
| 2019/0035282 A1* | 1/2019 | Ferguson | G05D 1/0276 |
| 2020/0198620 A1* | 6/2020 | Nakata | B60W 60/0053 |
| 2020/0257317 A1* | 8/2020 | Musk | G05D 1/0033 |
| 2020/0310431 A1* | 10/2020 | Matsunaga | G05D 1/0011 |
| 2021/0024100 A1* | 1/2021 | Calleija | G08G 1/202 |
| 2022/0379916 A1* | 12/2022 | Ferguson | B60W 60/0051 |
| 2023/0195135 A1* | 6/2023 | Kote | B60W 60/00253 |
| | | | 701/23 |
| 2023/0205181 A1* | 6/2023 | Kishikawa | G05D 1/227 |
| | | | 701/2 |

FOREIGN PATENT DOCUMENTS

| CN | 113518956 A | * 10/2021 | ............ B60K 35/00 |
|---|---|---|---|
| JP | 2018077649 A | * 5/2018 | |

OTHER PUBLICATIONS

CN 113518956A—machine translation (Year: 2021).*
JP 2018077649 A—machine translation (Year: 2018).*

* cited by examiner

*Primary Examiner* — Dino Kujundzic
(74) *Attorney, Agent, or Firm* — SLATER MATSIL, LLP (57) ABSTRACT

An embodiment apparatus for controlling a driving mode of a robo-taxi includes a communication device configured to provide a communication interface with a master key and a controller configured to change the driving mode of the robo-taxi based on a control signal from the master key. An embodiment method of controlling a driving mode of a robo-taxi includes receiving a control signal from a master key and changing the driving mode of the robo-taxi based on the control signal from the master key.

18 Claims, 7 Drawing Sheets

APPARATUS FOR CONTROLLING DRIVING MODE OF ROBO-TAXI AND METHOD THEREOF

CROSS-REFERENCE TO RELATED APPLICATIONS

This application claims the benefit of Korean Patent Application No. 10-2022-0021686, filed on Feb. 18, 2022, which application is hereby incorporated herein by reference.

TECHNICAL FIELD

The present disclosure relates to an apparatus for controlling a driving mode of a robo-taxi and a method thereof.

BACKGROUND

Countries around the world, including the United States, have already prepared for the era of autonomous vehicles through the implementation of limited autonomous driving and temporary autonomous driving systems. An autonomous vehicle is a vehicle that recognizes the surrounding environment by itself and drives a route to a destination while making judgments about risks. The autonomous vehicle means a vehicle that can drive safely by itself with minimal driving manipulation by a driver.

Currently, the operation of level 3 or higher autonomous vehicles is legally possible mainly in the United States, Germany, Singapore, etc., and the limited autonomous vehicle operation is gradually expanding in line with the speed of technology development. South Korea has also prepared to introduce self-driving buses in Pangyo and Sejong City, and SOCAR®, which is a domestic car-sharing service company in Korea, has prepared a commercial service for autonomous vehicles with SK Telecom and has demonstrated an autonomous vehicle for car sharing in November 2018. Autonomous driving artificial intelligence for car-sharing connects the nearest customer and vehicle and searches for the optimal driving route, and the vehicle drives safely by itself and exchanges information with the control center and traffic lights through the internal communication module while driving.

In relation to such an autonomous driving vehicle commercial service, not only existing ride-sharing service companies but also IT companies researching autonomous driving technology have actively prepared for the commercialization of autonomous driving taxis. Alphabet's Waymo (Alphabet is Google's parent company) launched the world's first commercial driverless car service in parts of Phoenix in December 2018 for some licensed residents. Hyundai-Mobis (a company in South Korea) also partnered with Yandex (the largest internet search engine company in Russia) to deploy 100 new Sonata vehicle-based unmanned robo-taxis across Russia in 2020.

The commercialization of autonomous vehicles is expected to bring about many changes in various fields such as transportation and logistics as well as insurance, and it is predicted that people will recognize automobiles that have been considered as objects of ownership as objects of sharing. The autonomous vehicle market is expected to grow rapidly between 2025 and 2035. In the early stage of commercialization of taxi services using autonomous vehicles, they will be introduced sequentially, starting with level 3 autonomous taxis. After the safety of autonomous driving taxis has been sufficiently reviewed, it is expected that the fully autonomous taxi, 'robo-taxi', of level 5 will be commercialized.

In the future, when a robo-taxi is used for a car-sharing service, it is expected that the transportation share of autonomous taxis will be more than 50%. When the robo-taxi is used within a limited area, it is possible to significantly lower the transportation cost and, depending on the number of passengers, it is possible to reduce the level of public transportation such as subway or bus, so it is expected to become the main means of passenger transportation. In addition, unlike traditional taxi companies, because the robo-taxi does not require a driver, it is expected that various new types of transportation network companies (TNCs) will be introduced.

In the process of operating a plurality of robo-taxis, there is an active discussion on a scheme for efficiently setting and changing the driving mode of the robo-taxi, but a specific scheme has not been proposed yet.

The matters described in this background section are intended to promote an understanding of the background of the disclosure and may include matters that are not already known to those of ordinary skill in the art.

SUMMARY

The present disclosure relates to an apparatus for controlling a driving mode of a robo-taxi and a method thereof. Particular embodiments relate to a technology for efficiently setting and changing the driving mode of each robo-taxi in the process of operating a plurality of robo-taxis.

Embodiments of the present disclosure can solve problems occurring in the prior art while advantages achieved by the prior art are maintained intact.

An embodiment of the present disclosure provides an apparatus and a method for controlling a driving mode of a robo-taxi that can efficiently operate a plurality of robo-taxis by registering an operator-dedicated smart key as a master key in the plurality of robo-taxis, changing the driving mode of the robo-taxi based on a control signal from the master key, and performing switching between an operator mode and an autonomous driving mode at a specific location.

The technical features of embodiments of the present disclosure are not limited to the above-mentioned features, and other unmentioned technical features and advantages will become apparent from the following description. Also, it may be easily understood that the objects and advantages of embodiments of the present disclosure may be realized by the units and combinations thereof recited in the claims.

According to an embodiment of the present disclosure, an apparatus for controlling a driving mode of a robo-taxi includes a communication device that provides a communication interface with a master key, and a controller that changes the driving mode of the robo-taxi based on a control signal from the master key.

According to an embodiment, the driving mode may include at least one of a manual mode, an autonomous driving mode, and an operator mode.

According to an embodiment, the communication device may receive a control signal for changing the driving mode of the robo-taxi from the operator mode to the autonomous driving mode from the master key.

According to an embodiment, the controller may change the driving mode of the robo-taxi from the operator mode to the autonomous driving mode when a current location of the robo-taxi is a preset location.

According to an embodiment, the communication device may receive a control signal for changing the driving mode of the robo-taxi from the autonomous driving mode to the operator mode from the master key.

According to an embodiment, the controller may change the driving mode of the robo-taxi from the autonomous driving mode to the operator mode when a current location of the robo-taxi is a preset location.

According to an embodiment, the apparatus may further include a vehicle network connection device that provides a connection interface with a vehicle network.

According to an embodiment, the controller may change the driving mode of the robo-taxi from the autonomous driving mode to the operator mode regardless of a current location of the robo-taxi when receiving a control signal permitting to change the driving mode of the robo-taxi from the autonomous driving mode to the operator mode through the vehicle network connection device.

According to another embodiment of the present disclosure, a method of controlling a driving mode of a robo-taxi includes receiving, by a communication device, a control signal from a master key, and changing, by a controller, the driving mode of the robo-taxi based on the control signal from the master key.

According to an embodiment, the receiving of the control signal may include receiving a control signal for changing the driving mode of the robo-taxi from the operator mode to the autonomous driving mode from the master key, and the changing of the driving mode may include changing the driving mode of the robo-taxi from the operator mode to the autonomous driving mode when a current location of the robo-taxi is a preset location.

According to an embodiment, the receiving of the control signal may include receiving a control signal for changing the driving mode of the robo-taxi from the autonomous driving mode to the operator mode from the master key, and the changing of the driving mode may include changing the driving mode of the robo-taxi from the autonomous driving mode to the operator mode when a current location of the robo-taxi is a preset location.

According to an embodiment, the changing of the driving mode may include changing the driving mode of the robo-taxi from the autonomous driving mode to the operator mode regardless of a current location of the robo-taxi when receiving a control signal permitting to change the driving mode of the robo-taxi from the autonomous driving mode to the operator mode through a vehicle network.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
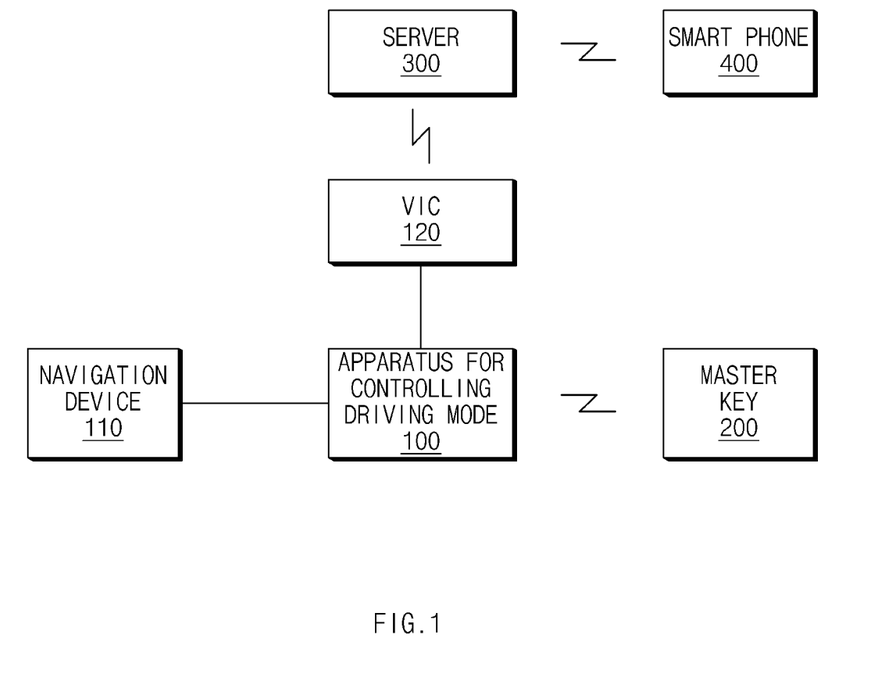
FIG. 1 is a block diagram illustrating the configuration of a system for controlling a driving mode of a robo-taxi according to an embodiment of the present disclosure.

FIG. 1 is a block diagram illustrating the configuration of a system for controlling a driving mode of a robo-taxi according to an embodiment of the present disclosure.

As shown in FIG. 1, a system for controlling a driving mode of a robo-taxi according to an embodiment of the present disclosure may include an apparatus 100 for controlling a driving mode, a navigation device 110, a vehicle interface controller (VIC) 120, a master key 200, a server 300, and a smart phone 400.

Regarding each component, first, the apparatus 100 for controlling a driving mode may be implemented as an integrated body control unit (IBU) as an example, and change the driving mode of the robo-taxi by interworking with the navigation device 110 and the VIC 120. That is, the apparatus 100 for controlling a driving mode may receive a control command from the server 300 through the VIC 120, and when a signal requesting to switch from an operator mode to an autonomous driving mode is received from the master key 200, a signal requesting autonomous driving from a garage to an auto-drive starting point may be transmitted to the VIC 120. In this case, the driving mode may include a manual mode in which a driver drives a robo-taxi, an autonomous driving mode in which the VIC 120 drives a robo-taxi, an operator mode in which the VIC 120 assists an operator in driving, and the like.

In addition, the apparatus 100 for controlling a driving mode may communicate with the master key 200, and may also perform authentication of the master key 200.

The apparatus 100 for controlling a driving mode may register an operator-dedicated smart key as the master key 200 in a plurality of robo-taxis, change the driving mode of the robo-taxi based on a control signal from the master key 200, and perform switching between the operator mode and the autonomous driving mode at a specific location, so that it is possible to efficiently operate a plurality of robo-taxis. In this case, the apparatus 100 for controlling a driving mode may take into consideration a turn-on state and a stopped state of the robo-taxi as a driving mode switching condition. That is, the apparatus 100 for controlling a driving mode may change the driving mode of the robo-taxi when the robo-taxi is in the stopped state while being turned on.

The navigation device 110, which is a module provided in the robo-taxi, may be equipped with a GPS receiver and a precision map to detect the current location coordinates of the robo-taxi. In addition, the navigation device 110 may provide a place name, a landmark and an address corresponding to the current location coordinates of the robo-taxi. The navigation device 110 may be replaced with an audio video navigation (AVN) system.

The VIC 120, which is a controller in charge of autonomous driving of a robo-taxi, may transmit various control commands (door lock/unlock, driving mode conversion, and the like) from the server 300 to the apparatus 100 for controlling a driving mode.

The VIC 120, which is a module that provides a communication interface with the server 300, may include at least one of a mobile communication module, a wireless Internet module, and a short-range communication module.

The mobile communication module may communicate with the server 300 through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), 4G (4th Generation mobile telecommunication), 5G (5th Generation mobile telecommunication), and the like).

The wireless Internet module, which is a module for wireless Internet access, may communicate with the server 300 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication with the server 300 by using at least one of Bluetooth™, radio frequency identification (RFID), infrared data association (IrDA), ultra wideband (UWB), ZigBee, near field communication (NFC), and wireless universal serial bus (USB) technology.

The master key 200, which is an operator-only smart key, may be registered in a plurality of robo-taxis, and may generate a control signal for changing the driving mode of each robo-taxi.

The server 300, which is provided in a control center to control a plurality of robo-taxis, may communicate with the smart phone 400. That is, the server 300 may transmit a request message from the smart phone 400 to the apparatus 100 for controlling a driving mode through the VIC 120, or may transmit various guide messages to the smart phone 400. For example, the server 300 may transmit a message of guiding the movement of a first robo-taxi to the smart phone 400 of an operator in response to a request from the VIC 120. In this case, the content of the guidance message may be 'The waiting time of the first robo-taxi has exceeded the specified time (e.g., 15 minutes), so please move the first robo-taxi to an area where there are many users'. In this case, the server 300 may transmit a guide message to the smart phone 400 of an operator located within a preset distance (e.g., 10 km) from the current location of the first robo-taxi.

The smart phone 400 may include a robo-taxi user's smartphone as well as a robo-taxi operator's smartphone, and may transmit/receive a guide message to/from the server 300.

Figure 2:
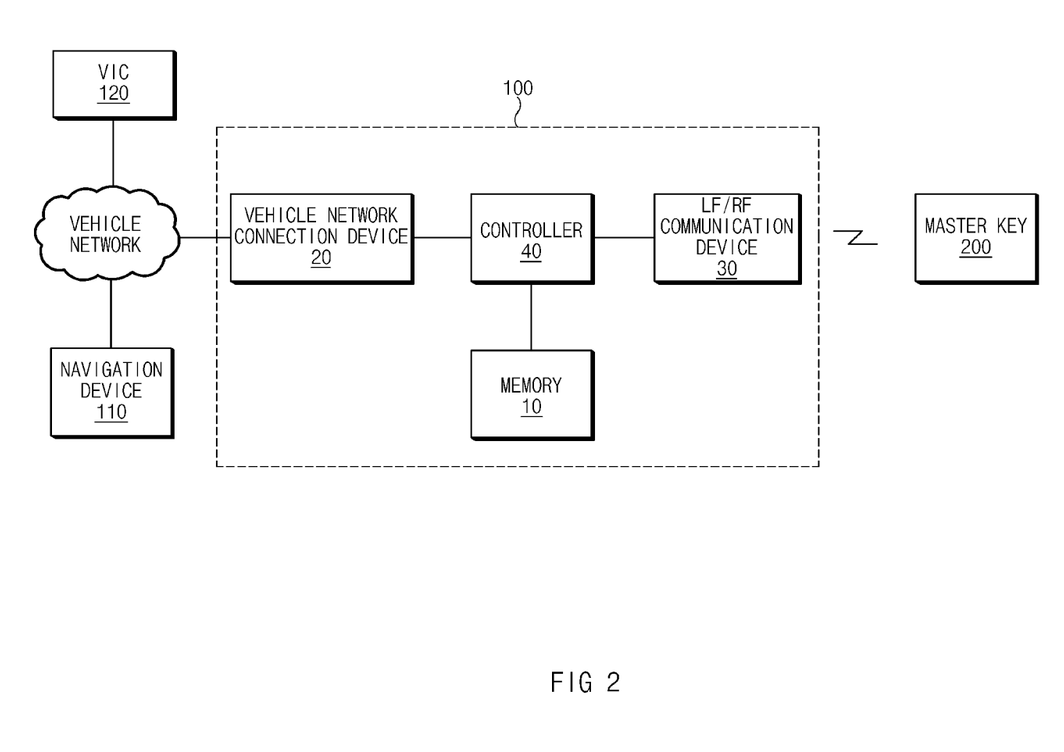
FIG. 2 is a block diagram illustrating a configuration of an apparatus for controlling a driving mode of a robo-taxi according to an embodiment of the present disclosure.

FIG. 2 is a block diagram illustrating a configuration of an apparatus for controlling a driving mode of a robo-taxi according to an embodiment of the present disclosure.

As shown in FIG. 2, the apparatus 100 for controlling a driving mode of a robo-taxi according to an embodiment of the present disclosure may include a memory (i.e., storage) 10, a vehicle network connection device 20, a low frequency/radio frequency (LF/RF) communication device 30, and a controller 40. In this case, depending on a method of implementing the apparatus 100 for controlling a driving mode of a robo-taxi according to an embodiment of the present disclosure, components may be combined with each other to be implemented as one, or some components may be omitted.

Regarding each component, the memory 10 may store various logic, algorithms and programs required in the processes of registering an operator-dedicated smart key as the master key 200 in a plurality of robo-taxis, changing the driving mode of a robo-taxi based on a control signal from the master key 200, and performing switching between an operator mode and an autonomous driving mode at a specific location.

The memory 10 may store location information of a garage and location information of a start point of the auto drive and location information of an end point of the auto drive. In this case, the garage indicates the location where the driving mode of the robo-taxi is changed from the operator mode to the autonomous driving mode or from the autonomous driving mode to the operator mode, the auto drive starting point indicates the starting point of the robo-taxi operation, and the auto drive end point indicates the end point of the robo-taxi operation. In this case, the auto drive end point may be set to a location where the driving mode of the robo-taxi is switched from the autonomous driving mode to the operator mode.

The memory 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The vehicle network connection device 20 may be a module which provides a connection interface with a vehicle network provided in the robo-taxi. The controller 40 may obtain various types of information from the navigation device 110 and the VIC 120 through the vehicle network. For example, the controller 40 may obtain the current location information from the navigation device 110 through the vehicle network, or receive a control signal for permitting to change the driving mode of the robo-taxi from the autonomous driving mode to the operator mode or from the operator mode to the autonomous driving mode from the VIC 120.

In this case, the vehicle network may include a controller area network (CAN), a controller area network with flexible data-rate (CAN FD), a local interconnect network (LIN), FlexRay, media oriented systems transport (MOST), Ethernet, and the like.

The LF/RF communication device 30, which is a module responsible for communication with the master key 200, may receive, from the master key 200, a control signal (e.g., a lock button input signal) for changing the driving mode of the robo-taxi from the operator mode to the autonomous driving mode or a control signal (e.g., an unlock button input signal) for changing the driving mode of the robo-taxi from the autonomous driving mode to the operator mode.

The controller 40 may perform overall control such that each component performs its function normally. The controller 40 may be implemented in the form of hardware or software, or may be implemented in a combination of hardware and software. Preferably, the controller 40 may be implemented as a microprocessor, but is not limited thereto.

Specifically, the controller 40 may perform various controls required in the processes of registering an operator-dedicated smart key as the master key 200 in the plurality of robo-taxis, changing the driving mode of a robo-taxi based on a control signal from the master key 200, and performing the switching between the operator mode and the autonomous driving mode at a specific location.

Hereinafter, the operation of the controller 40 will be described in detail with reference to FIGS. 3 to 5.

Figure 3:
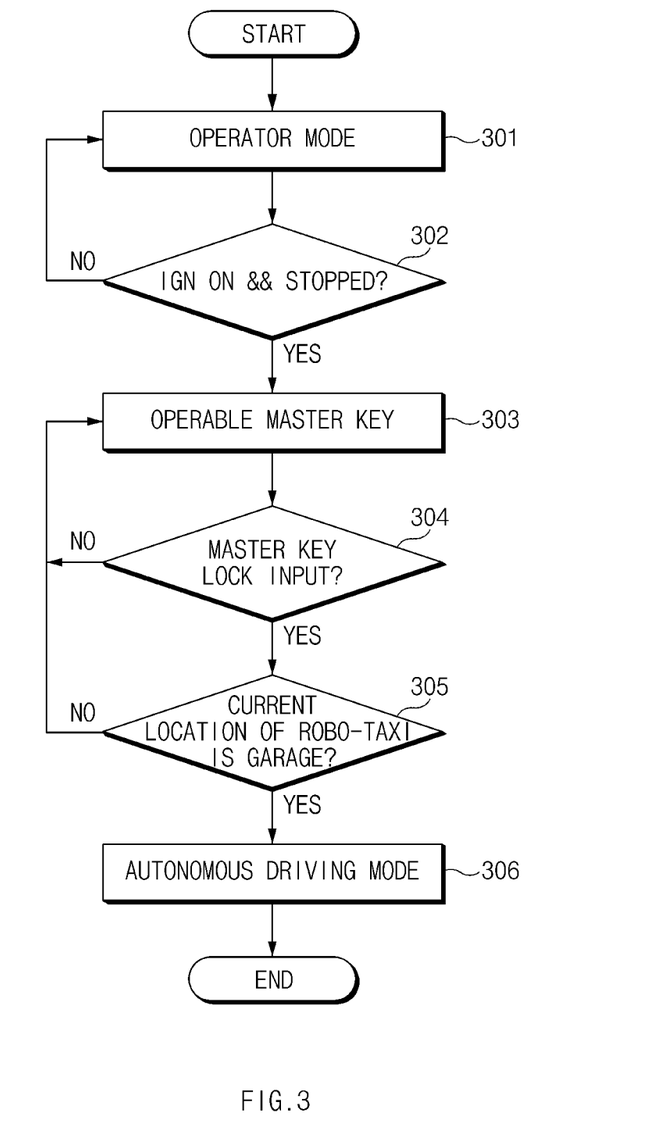
FIG. 3 is a flowchart illustrating a first example of a process of changing a driving mode by a controller provided in an apparatus for controlling a driving mode of a robo-taxi according to an embodiment of the present disclosure.

FIG. 3 is a flowchart illustrating a first example of a process of changing a driving mode by a controller provided in an apparatus for controlling a driving mode of a robo-taxi according to an embodiment of the present disclosure.

First, in 301, the driving mode of a robo-taxi is set to the operator mode.

Then, when the robo-taxi is turned on (IGN ON) and is stopped in 302, the controller 40 determines that the master key 200 is in an operable state in 303.

Then, when a control signal (e.g., a lock button input signal) for changing the driving mode of the robo-taxi from the operator mode to the autonomous driving mode is received from the master key 200 in 304, the controller 40 determines whether the current location of the robo-taxi is a garage in 305.

Then, when the current location of the robo-taxi is the garage in 305, the controller 40 changes the driving mode of the robo-taxi from the operator mode to the autonomous driving mode in 306. In this case, when the current location of the robo-taxi is not the garage, the controller 40 does not change the driving mode of the robo-taxi from the operator mode to the autonomous driving mode.

Figure 4:
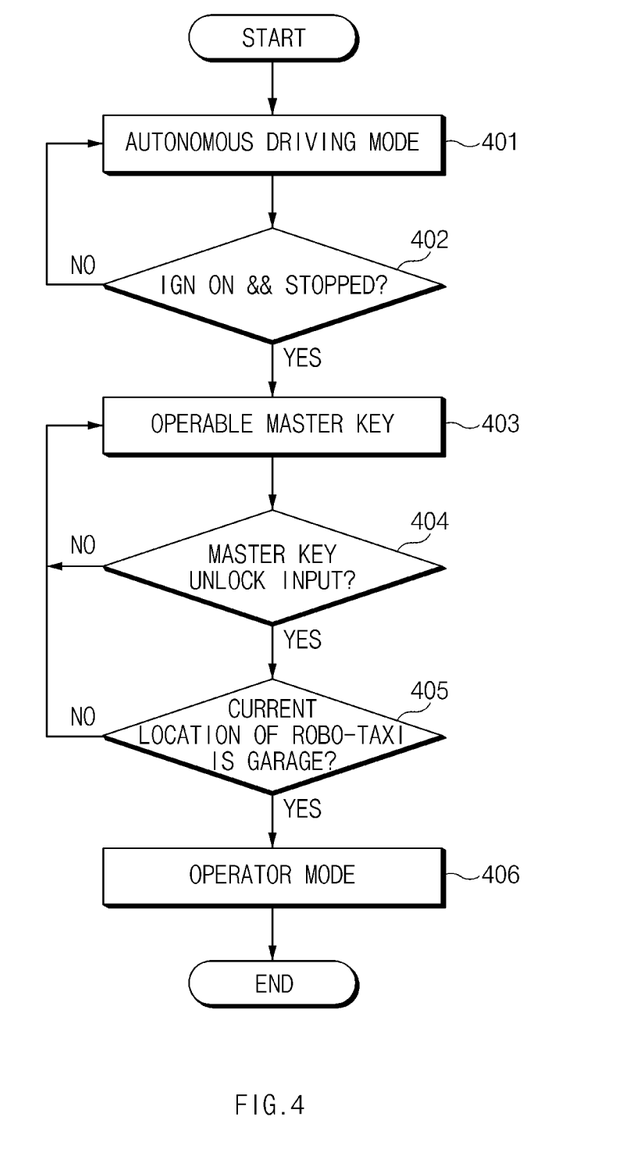
FIG. 4 is a flowchart illustrating a second example of a process of changing a driving mode by a controller provided in an apparatus for controlling a driving mode of a robo-taxi according to an embodiment of the present disclosure.

FIG. 4 is a flowchart illustrating a second example of a process of changing a driving mode by a controller provided in an apparatus for controlling a driving mode of a robo-taxi according to an embodiment of the present disclosure.

First, in 401, the driving mode of a robo-taxi is set to the autonomous driving mode.

Then, when the robo-taxi is turned on (IGN ON) and is stopped in 402, the controller 40 determines that the master key 200 is in an operable state in 403.

Then, when a control signal (e.g., an unlock button input signal) for changing the driving mode of the robo-taxi from the autonomous driving mode to the operator mode is received from the master key 200 in 404, the controller 40 determines whether the current location of the robo-taxi is a garage in 405. In this case, the controller 40 may further determine whether the current location of the robo-taxi is the auto drive end point.

Then, when the current location of the robo-taxi is the garage in 405, the controller 40 changes the driving mode of the robo-taxi from the autonomous driving mode to the operator mode in 406. In this case, the controller 40 may change the driving mode of the robo-taxi from the autonomous driving mode to the operator mode even when the current location of the robo-taxi is the auto drive end point.

Figure 5:
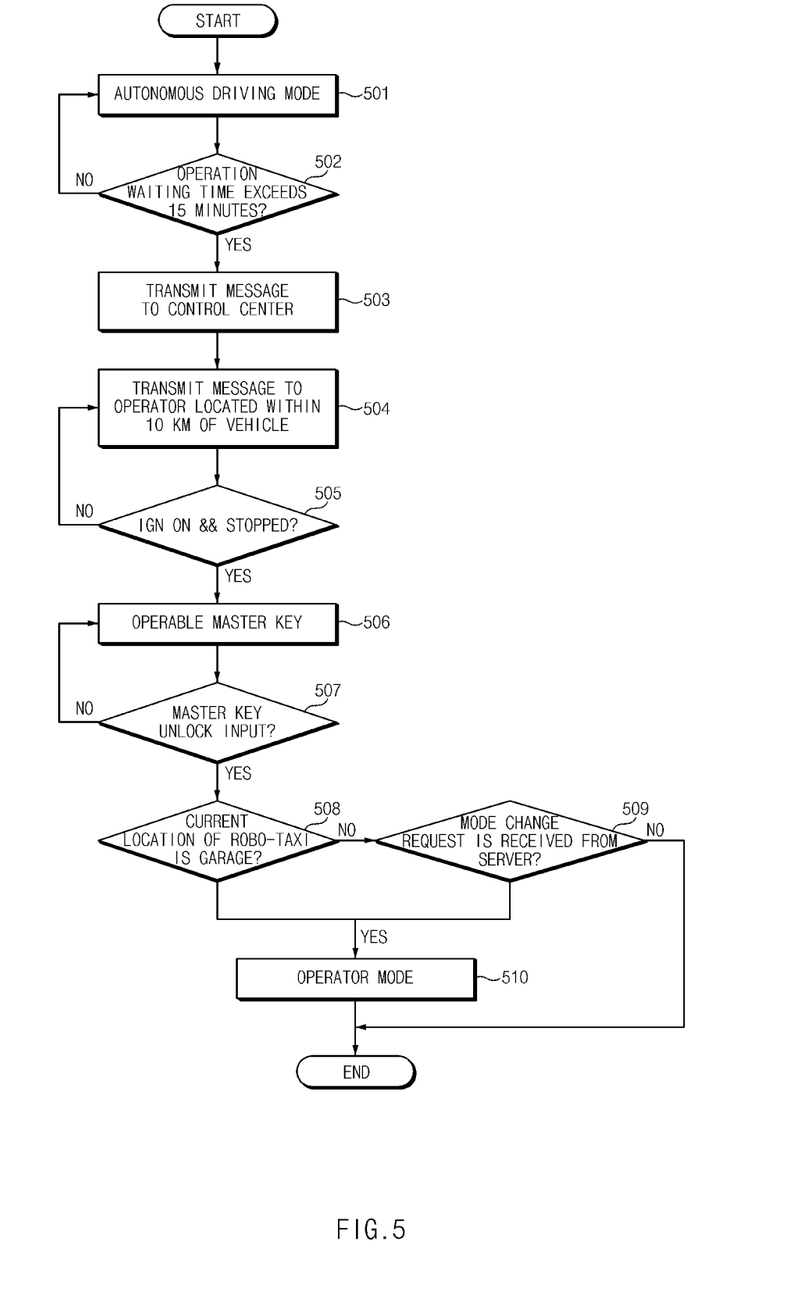
FIG. 5 is a flowchart illustrating a third example of a process of changing a driving mode by a controller provided in an apparatus for controlling a driving mode of a robo-taxi according to an embodiment of the present disclosure.

FIG. 5 is a flowchart illustrating a third example of a process of changing a driving mode by a controller provided in an apparatus for controlling a driving mode of a robo-taxi according to an embodiment of the present disclosure.

First, in 501, the driving mode of a robo-taxi is set to the autonomous driving mode.

Then, when the waiting time (time to wait for guests) of the robo-taxi exceeds a preset time (e.g., 15 minutes) in 502, the VIC 120 transmits a guidance message to the server 300 of a control center in 503. In this case, the content of the guidance message may be 'Please move the robo-taxi to an area where there are many users'.

Meanwhile, when the VIC 120 cannot communicate with the apparatus 100 for controlling a driving mode, the VIC 120 may transmit a guidance message to the server 300 of the control center. In this case, the content of the guidance message may be 'Please retrieve the robo-taxi because the communication between the VIC 120 and the apparatus 100 for controlling a driving mode is impossible'.

Then, the server 300 transmits the guidance message to the smart phone 400 of the operator in 504. In this case, the server 300 may transmit a control signal of permitting to change the driving mode of the robo-taxi from the autonomous driving mode to the operator mode to the controller 40 through the VIC 120. In addition, the server 300 may transmit the guidance message to the smart phone 400 of the operator located within a preset distance (e.g., 10 km) from the robo-taxi.

Then, when the robo-taxi is turned on (IGN ON) and is stopped in 505, the controller 40 determines that the master key 200 is in an operable state in 506.

Then, when the control signal (e.g., a unlock button input signal) for changing the driving mode of the robo-taxi from the autonomous driving mode to the operator mode is received from the master key 200 in 507, the controller 40 determines whether the current location of the robo-taxi is a garage in 508.

As the determination result 508, when the current location of the robo-taxi is the garage, the controller 40 changes the driving mode of the robo-taxi from the autonomous driving mode to the operator mode in 510.

As the determination result 508, when the current location of the robo-taxi is not the garage, in 509, the controller 40 determines whether the control signal of permitting to change the driving mode of the robo-taxi from the autonomous driving mode to the operator mode is received from the server 300.

Then, when the control signal is received in 509, the controller 40 changes the driving mode of the robo-taxi from the autonomous driving mode to the operator mode in 510.

Figure 6:
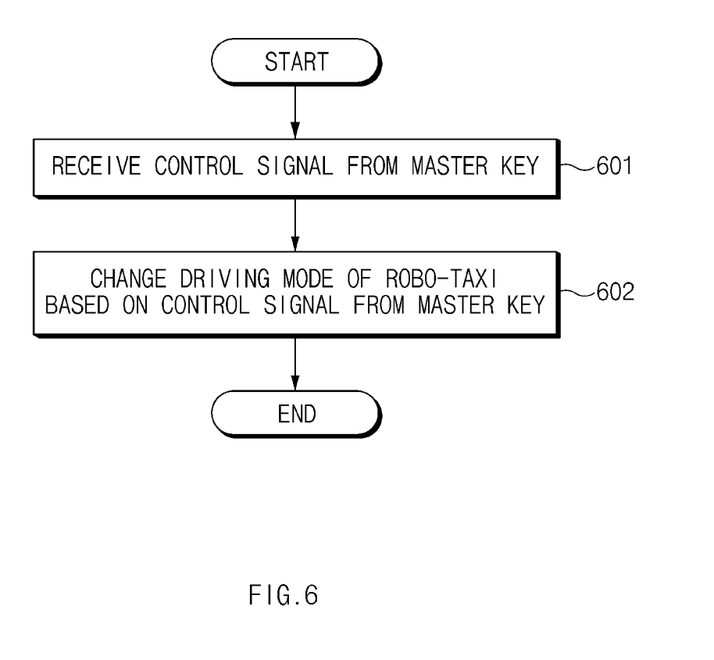
FIG. 6 is a flowchart illustrating a method of controlling a driving mode of a robo-taxi according to an embodiment of the present disclosure.

FIG. 6 is a flowchart illustrating a method of controlling a driving mode of a robo-taxi according to an embodiment of the present disclosure.

First, the LF/RF communication device 30 receives the control signal from the master key 200 in 601.

Then, in 602, the controller 40 changes the driving mode of the robo-taxi based on the control signal from the master key 200.

Figure 7:
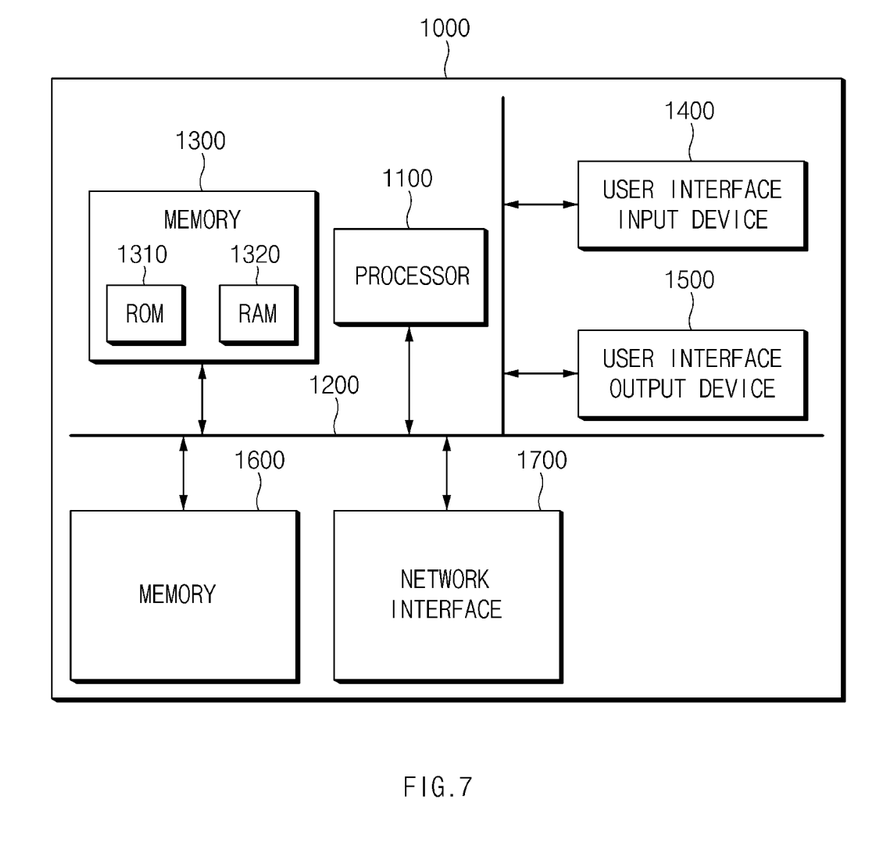
FIG. 7 is a block diagram illustrating a computing system for executing a method of controlling a driving mode of a robo-taxi according to an embodiment of the present disclosure.

FIG. 7 is a block diagram illustrating a computing system for executing a method of controlling a driving mode of a robo-taxi according to an embodiment of the present disclosure.

Referring to FIG. 7, a method of controlling a driving mode of a robo-taxi according to an embodiment of the present disclosure described above may be implemented through a computing system. A computing system 1000 may include at least one processor 1100, a memory 1300, a user interface input device 1400, a user interface output device 1500, a memory (i.e., storage) 1600, and a network interface 1700 connected through a system bus 1200.

The processor 1100 may be a central processing device (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the memory 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

As described above, according to the embodiments of the present disclosure, the apparatus and method for controlling a driving mode of a robo-taxi can efficiently operate the plurality of robo-taxis by registering the operator-dedicated smart key as the master key in the plurality of robo-taxis, changing the driving mode of the robo-taxi based on a control signal from the master key, and performing switching between the operator mode and the autonomous driving mode at a specific location.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a driving mode of a robo-taxi, the apparatus comprising:
   a communication device configured to provide a communication interface with a master key; and
   a controller configured to change the driving mode of the robo-taxi based on a control signal from the master key,
   wherein the control signal comprises at least one of a lock button input signal, an unlock button input signal, or any combination thereof.

2. The apparatus of claim 1, wherein the driving mode comprises at least one of a manual mode, an autonomous driving mode, or an operator mode, or any combination thereof.

3. The apparatus of claim 2, wherein the communication device is configured to receive the control signal to change the driving mode of the robo-taxi from the operator mode to the autonomous driving mode from the master key.

4. The apparatus of claim 3, wherein the controller is configured to change the driving mode of the robo-taxi from the operator mode to the autonomous driving mode when a current location of the robo-taxi is a preset location.

5. The apparatus of claim 2, wherein the communication device is configured to receive the control signal to change the driving mode of the robo-taxi from the autonomous driving mode to the operator mode from the master key.

6. The apparatus of claim 5, wherein the controller is configured to change the driving mode of the robo-taxi from the autonomous driving mode to the operator mode when a current location of the robo-taxi is a preset location.

7. The apparatus of claim 2, further comprising a vehicle network connection device configured to provide a connection interface with a vehicle network.

8. The apparatus of claim 7, wherein the controller is configured to change the driving mode of the robo-taxi from the autonomous driving mode to the operator mode regardless of a current location of the robo-taxi when receiving a control signal permitting change of the driving mode of the robo-taxi from the autonomous driving mode to the operator mode through the vehicle network connection device.

9. A method of controlling a driving mode of a robo-taxi, the method comprising:
   receiving a control signal from a master key; and
   changing the driving mode of the robo-taxi based on the control signal from the master key,
   wherein the control signal comprises at least one of a lock button input signal, or an unlock button input signal, or any combination thereof.

10. The method of claim 9, wherein the driving mode comprises at least one of a manual mode, an autonomous driving mode, or an operator mode, any combination thereof.

11. The method of claim 10, wherein receiving the control signal comprises receiving the control signal to change the driving mode of the robo-taxi from the operator mode to the autonomous driving mode from the master key.

12. The method of claim 11, wherein the changing of the driving mode comprises changing the driving mode of the robo-taxi from the operator mode to the autonomous driving mode when a current location of the robo-taxi is a preset location.

13. The method of claim 10, wherein receiving the control signal comprises receiving the control signal to change the driving mode of the robo-taxi from the autonomous driving mode to the operator mode from the master key.

14. The method of claim 13, wherein the changing of the driving mode comprises changing the driving mode of the robo-taxi from the autonomous driving mode to the operator mode when a current location of the robo-taxi is a preset location.

15. The method of claim 10, wherein the changing of the driving mode comprises changing the driving mode of the robo-taxi from the autonomous driving mode to the operator mode regardless of a current location of the robo-taxi when receiving a control signal permitting change of the driving mode of the robo-taxi from the autonomous driving mode to the operator mode through a vehicle network.

16. A system for controlling a driving mode of a robo-taxi, the system comprising:
the robo-taxi configured to transmit a guide message to a server when an operation waiting time exceeds a preset time, receive a control signal permitting a change of the driving mode from an autonomous driving mode to an operator mode from the server, and change the driving mode from the autonomous driving mode to the operator mode regardless of a current location when an unlock button input signal to change the driving mode from the autonomous driving mode to the operator mode is received from a master key; and the server configured to transmit to the robo-taxi the control signal permitting the change of the driving mode from the autonomous driving mode to the operator mode when the guide message is received from the robo-taxi and transmit the guide message to a smart phone of an operator of the robo-taxi.

17. The system of claim 16, wherein the server is configured to transmit the guide message to the smart phone of the operator located within a preset distance from the robo-taxi.

18. The system of claim 16, wherein the robo-taxi is configured to change the driving mode of the robo-taxi from the operator mode to the autonomous driving mode only when the current location of the robo-taxi is a preset location when the control signal permitting the change of the driving mode from the autonomous driving mode to the operator mode is not received from the server.

* * * * *